(12) United States Patent
Morrow et al.

(10) Patent No.: US 7,177,057 B2
(45) Date of Patent: Feb. 13, 2007

(54) LASER SYSTEM

(75) Inventors: Cliff Morrow, Kingston, RI (US);
Rolland Zeleny, Sharon, MA (US)

(73) Assignee: Nutfield Technology, Inc., Windham, NH (US)

( * ) Notice: Subject to any disclaimer, the term of this patent is extended or adjusted under 35 U.S.C. 154(b) by 229 days.

(21) Appl. No.: 10/741,063

(22) Filed: Dec. 19, 2003

(65) Prior Publication Data
US 2005/0134950 A1    Jun. 23, 2005

(51) Int. Cl.
*G02B 26/08* (2006.01)
(52) U.S. Cl. ...................................... 359/196
(58) Field of Classification Search ................ 359/196
See application file for complete search history.

(56) References Cited
U.S. PATENT DOCUMENTS 4,528,525 A * 7/1985 Eden et al. ................. 359/289
6,181,719 B1 * 1/2001 Sukhman et al. .......... 372/38.1
6,690,702 B1 * 2/2004 Ohmi et al. .................. 372/57

* cited by examiner

*Primary Examiner*—Euncha P. Cherry
(74) *Attorney, Agent, or Firm*—Grossman, Tucker, Perreault & Pfleger PLLC (57) ABSTRACT

A compact laser system including a pendant including a laser tube having an optical resonator capable of generating a laser beam, and a scanning system including at least one optical beam deflector being capable of controlling a path of the laser beam. The laser tube and the scanning system are at least partially enclosed within a common housing. The compact laser system also includes a plug-in-module having a power source being capable of driving the laser, and a power source controller being capable of controlling the power source. The plug-in-module also includes an optical beam deflector controller being capable of controlling the scanning system.

12 Claims, 7 Drawing Sheets

LASER SYSTEM

FIELD

The present disclosure is directed at a laser marking and coding system, and more particularly at a compact laser marking and coding system.

BACKGROUND

Frequently it is desirable to mark or code an article or packaging with various types of information. For example, articles or packaging is provided with marking or coding directed at identifying the product. It is also common to include manufacturing information, such as lot number or manufacturing time or date, etc. Similarly, inventory or other control information may be provided on an article or package. Such markings or coding is typically at least partially variable in nature. Therefore, it may not be advantageous to incorporate such information on a mass printed label or use a stamp or other marking system that does not allow the information to be easily changed.

Various systems have been used in marking or coding articles or packaging. Typically, the marking or coding system is based on a conventional printing operation. For example, in the past, marking and coding systems have been based on screen printing techniques and roller transfer printing. More recently, coding and marking systems have been developed based on inkjet printing and thermal transfer printing.

Even more recently, lasers have been employed in coding and marking systems. According to a general laser marking system, a laser beam is scanned across a target to be marked. The incident energy footprint interacts with the target to produce a change in character. Depending on the application, the change produced by the laser may be visible, e.g. a change in color, or may be a machine detectable change. The information may be human readable text or one of a number of machine readable codes, such as barcodes.

Laser marking systems, in general, may provide several advantages over other marking systems, such as inkjet and thermal transfer marking and coding systems. For example, because laser marking systems do not require contact with the target surface, laser marking and coding systems may be more easily adapted to marking complex target geometries, such as contoured packages. Also laser systems require no consumable component, e.g., ink, and the marks may be permanent.

One drawback of laser marking and coding systems, however, is the relative large size of such systems as compared to inkjet and thermal transfer marking and coding systems. The size of the laser marking or coding system may make it difficult to integrate a laser marking system easily into a production line. Additionally, the large size of a laser marking or coding system, as compared to an inkjet or thermal transfer marking or coding head can make it difficult or impossible to retrofit an inkjet or thermal transfer system with a laser marking unit. Cost is another consideration when comparing laser systems to ink or thermal transfer systems. Laser systems may take a larger share of the product identification market if the initial capital cost of the systems is comparable.

BRIEF DESCRIPTION OF THE DRAWINGS

Features and advantages of the present invention are set forth herein by description of exemplary embodiments thereof, which description should be considered in conjunction with the accompanying drawings wherein.

DETAILED DESCRIPTION

Figure 1:
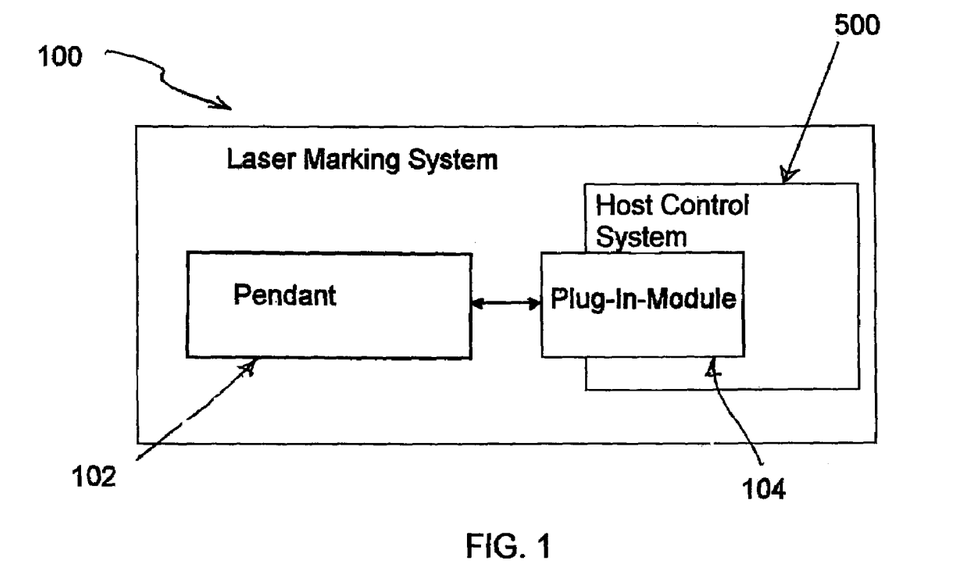
FIG. 1 is an illustration of an exemplary system embodiment.

FIG. 1 illustrates an exemplary system embodiment 100. The system 100 may comprise a pendant 102 and a plug-in-module 104. As used in any embodiment herein, "pendant" may be defined as one or more laser components at least partially enclosed in a common housing. In an embodiment, the pendant may include the components necessary to form and steer a focused beam of light, these components being at least partially enclosed within a common housing. In one more particular embodiment, the focused beam of light, for example, laser light may be used to mark or code information onto a target object. The "plug-in-module" (hereinafter "PIM"), as defined herein may contain at least one electronic component which may be required for the operation of at least one component of the pendant 102. For example, in one embodiment, the PIM 104 may comprise power supply components and/or control system components. As depicted in FIG. 1, The PIM 104 may also comprise interface connections to provide mechanical and electrical connectivity to the pendant 102 and a host control system 500. "Host control system", as used in any embodiment herein, may be defined generally as containing hardware and/or software to generate power and/or control signals to operate the pendant 102. The pendant/PIM configuration of the system may allow the size of the pendant to be reduced. Also, the use of a PIM may allow the control electronics for the laser to be separated from the host.

Figure 2:
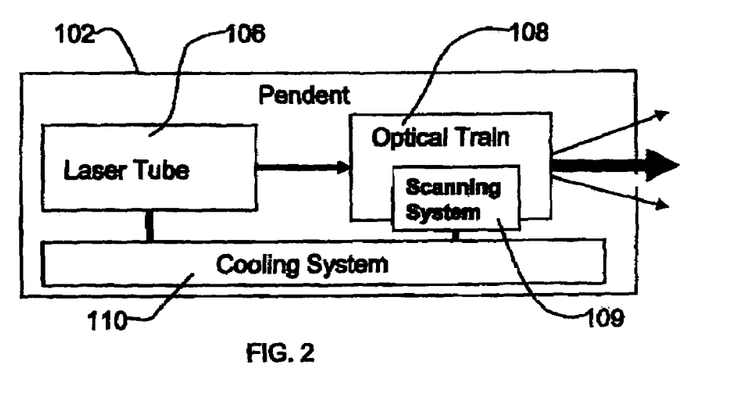
FIG. 2 is an illustration of an exemplary pendant embodiment.
Figure 6:
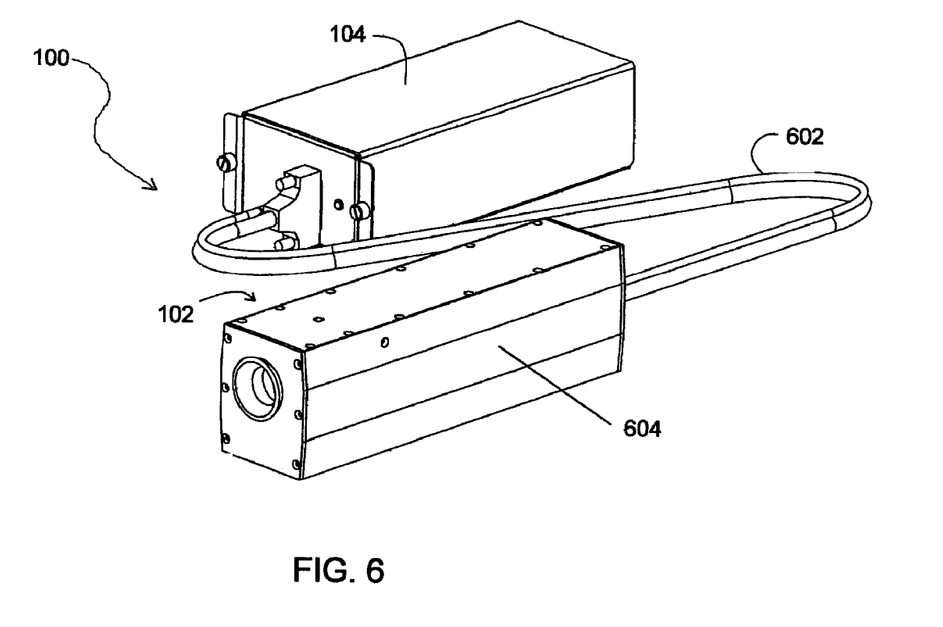
FIG. 6 is a representational perspective view of an exemplary embodiment of a compact laser system.

FIG. 2 depicts an exemplary illustration of a pendant 102. In an exemplary embodiment, the pendant 102 may comprise a laser tube 106, a scanning system 109, an optical train 108 and a cooling system 110, all of which may be enclosed within a common housing 604, as shown in FIG. 6. In the illustrated embodiment of FIG. 6, the housing 604 is shown enclosing the entire pendant 102. However, consistent with this disclosure, it should be understood that the housing may only partially enclose the pendant 102. For example, the housing may be configured to enclose the laser tube 106, while leaving the cooling system 110 exposed. Consistent with the preceding example, the scanning system 109 may also be fully or at least partially exposed. Those having skill in the art will appreciate various other configurations in which some or all of the components of the pendant are less than fully enclosed by the housing.

In at least one exemplary embodiment, the laser tube 106 may be coupled to the optical train 108. Alternatively, the laser tube 106 and the scanning system 109 may be coupled to a scanning assembly 109 and a cooling system 110. Accordingly, the pendant 102 may comprise those components necessary to generate a scanned focused beam on a target surface, thereby minimizing the size of the pendant 102. The components of the pendant 102 may be at least partially enclosed within a common housing.

The laser tube 106 may comprise core laser components required to produce light. Core laser components, as used herein, may include an optical resonator, a gain medium, and may further include a supporting frame to support the optical resonator and/or gain medium. Those having skill in the art will appreciate that laser tube 106 may also include features such as electrodes to excite the gain medium, however, it is understood that such features may vary depending upon the variety of laser employed. In the exemplary pendant 102, the laser tube 106 does not include a separate housing or cooling system. Rather the laser tube 106 may be enclosed within the common pendant housing 604, which may provide RF shielding for the laser tube 106 and resonant coils thereof, and may utilize the pendant cooling system 110. The elimination of a separate housing and cooling system for the laser tube 106 may allow the package size to be greatly reduced. Furthermore, the RF power amplifier, or other means to excite the laser, may be remote from the pendant 102. Remotely locating the RF power amplifier, or similar excitation means, may also allow the package size of the pendant 102 to be reduced.

Figure 3:
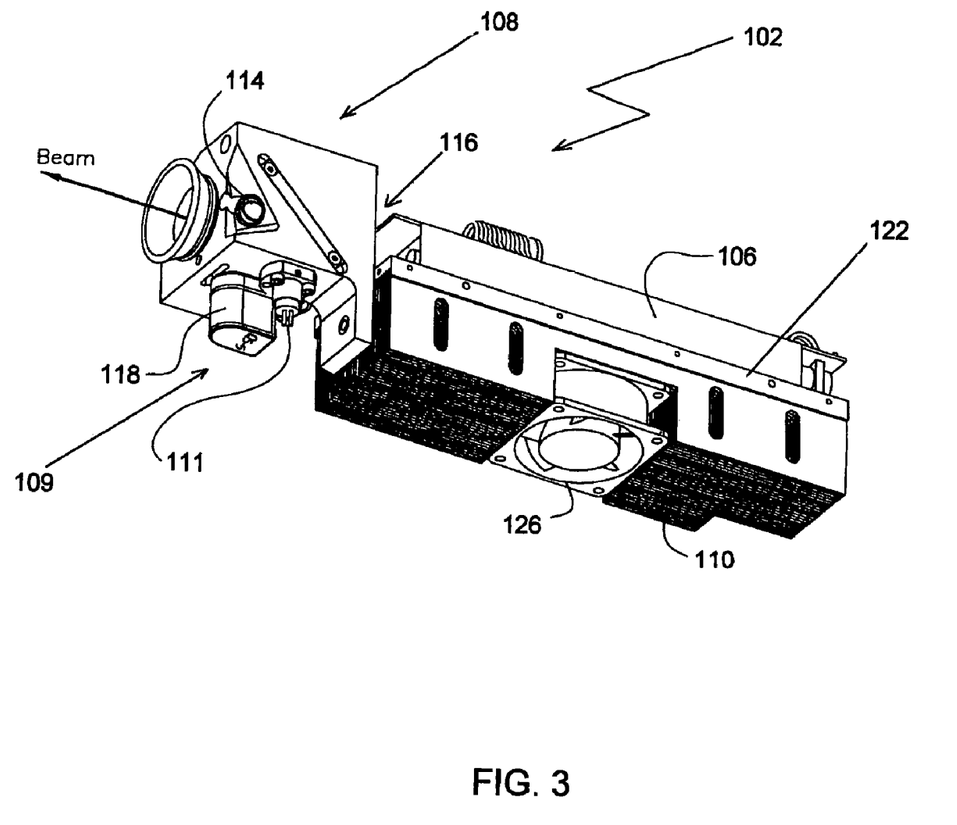
FIG. 3 shows an exemplary embodiment of a pendant from a bottom angle perspective view.
Figure 4:
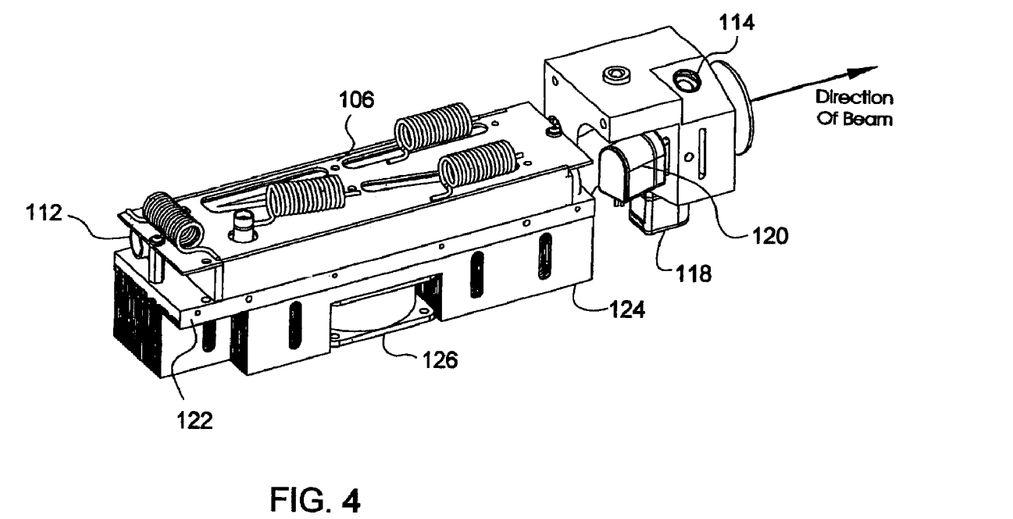
FIG. 4 is a perspective view of the exemplary pendant of FIG. 3 shown from a top angle.

Referring now to FIGS. 3 and 4, the laser tube 106 and scanning assembly 109 may be mounted on, or coupled to, a common chassis or optical bench 122. As used in any embodiment herein, chassis or optical bench is defined as any structure to which laser tube and/or the scanning assembly are coupled to maintain the relationship between the laser tube 106 and scanning system 109. If provided as a separate component, the optical train 108 may also be coupled to the same common chassis 122. Providing the laser tube 106, scanning assembly 109 and cooling system 110 in an integrated assembly may not only reduce the size of the pendant 102, but may also reduce or eliminates any redundant components, such as individual chassis, cooling systems, housings, etc. In this way, the pendant 102 can approach the size of other types of marking and coding heads, for example inkjet and thermal transfer heads and so may be more effectively deployed as replacement technology. Additional components, however, may be included in the pendant 102 to increase the versatility of the system.

The exemplary laser tube 106 may be a ceramic core unit, however, it should be appreciated that alternative laser tubes may be used without departing from the invention herein. A folded laser cavity, wherein the laser optical path and gain medium are folded one or more times, e.g., by folding mirrors 112, may also be employed to reduced the overall size of the laser tube 106, and therein also reduce the package size of the pendant 102.

The optical train 108 may comprise one or more lenses and/or mirrors and/or prisms which may be capable of shaping and/or directing and/or focusing the laser beam. These components may be arranged in a manner to minimize to the total volume of the assembly. Additionally, the optical train 108 may be provided as an integral portion of either, or both, the laser tube 106 and/or the scanning assembly 109, rather than as a separate, discrete component. For example, in one embodiment, the optical train 108 may actually be disposed around the scanning assembly 109 in that one or more lenses and/or mirrors and/or prisms may be located on the laser tube 106 side of the scanning system 109 for shaping and/or focusing and/or directing the laser beam to the scanning system 109. One or more lenses and/or mirrors and/or prisms may also be included on the target, or output, side of the scanning system for further shaping and/or focusing and/or directing the laser beam exiting the scanning system towards a target.

Figure 7:
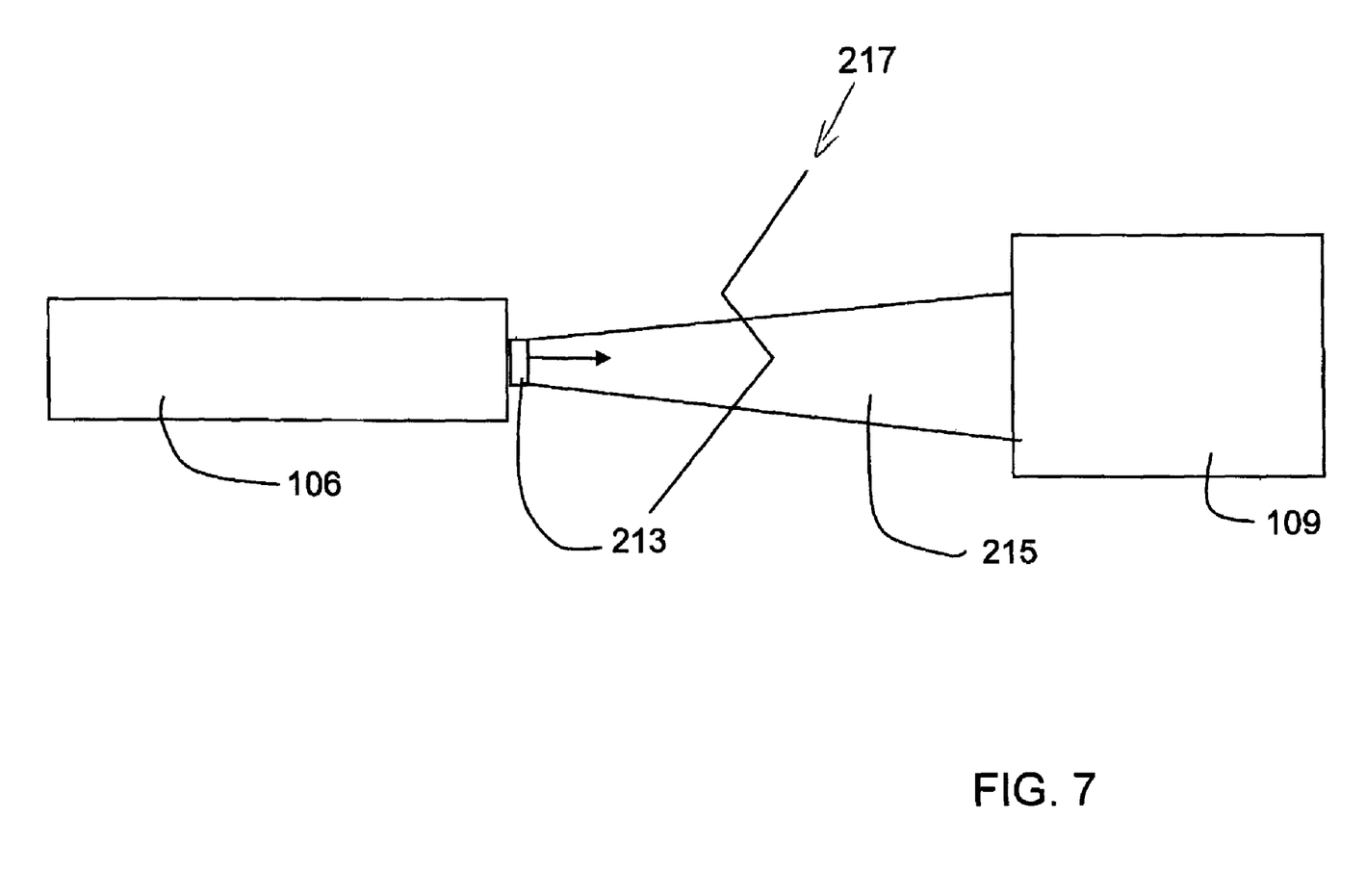
FIG. 7 shows an exemplary embodiment of a portion of an optical train.

According to one embodiment, the number of components in the optical train 108 may be reduced by utilizing various arrangements for the output coupler and/or beam expander, both generally indicated by 116. One such embodiment utilizes a folded optical pathway. As used herein, a folded optical pathway refers to the use of folding mirrors and or prisms, etc. to redirect an optical beam, e.g., reflect the beam, causing the beam to travel a greater distance. Referring to FIG. 7, a folded optical pathway may be used to eliminate the need for a beam expander in the optical train. The output coupler 213, i.e., a partially mirrored element of the optical resonator of the laser permitting the emission of a beam from the gain medium, will generate a slightly diverging beam 215. The slightly diverging beam 215 may be directed along a folded optical pathway, indicated in FIG. 7 by reference 217, using folding mirrors. The folded optical pathway may be sufficiently long to allow the slightly diverging beam 215 to diverge to a sufficient degree to produce the effect of a beam expander. Accordingly, the beam 215 may be large enough when it is supplied to the scanning assembly 109.

Figure 8:
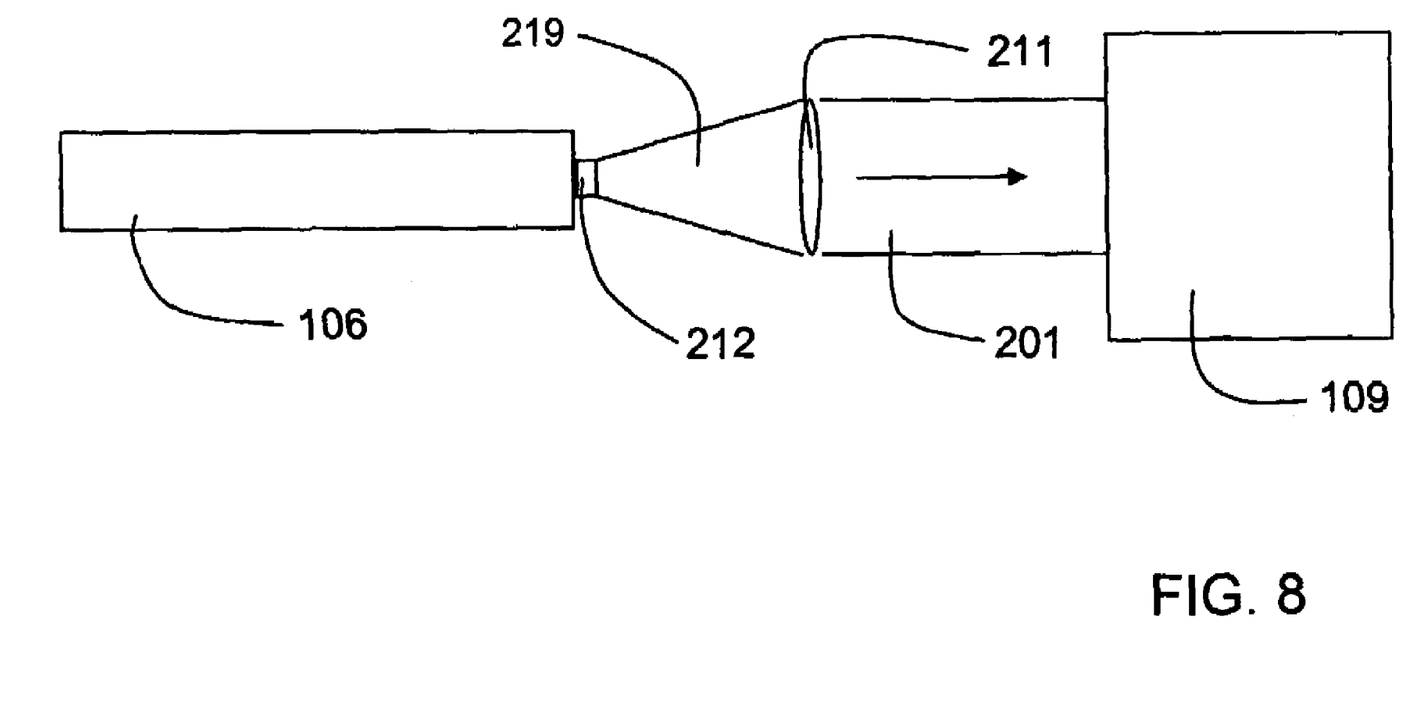
FIG. 8 shows another exemplary embodiment of a portion of an optical train.

According to an alternative exemplary embodiment, illustrated in FIG. 8, an output coupler 212 may include an integrated first element of a beam expander. Consistent with this aspect the beam 219 emitted from the output coupler 212 is a diverging beam. The diverging beam 219 may be fed to a lens 211 that may produce a beam 201 having a reduced rate of divergence and/or be a collimated beam. The beam 201 may then be fed to the scanning assembly.

Figure 9:
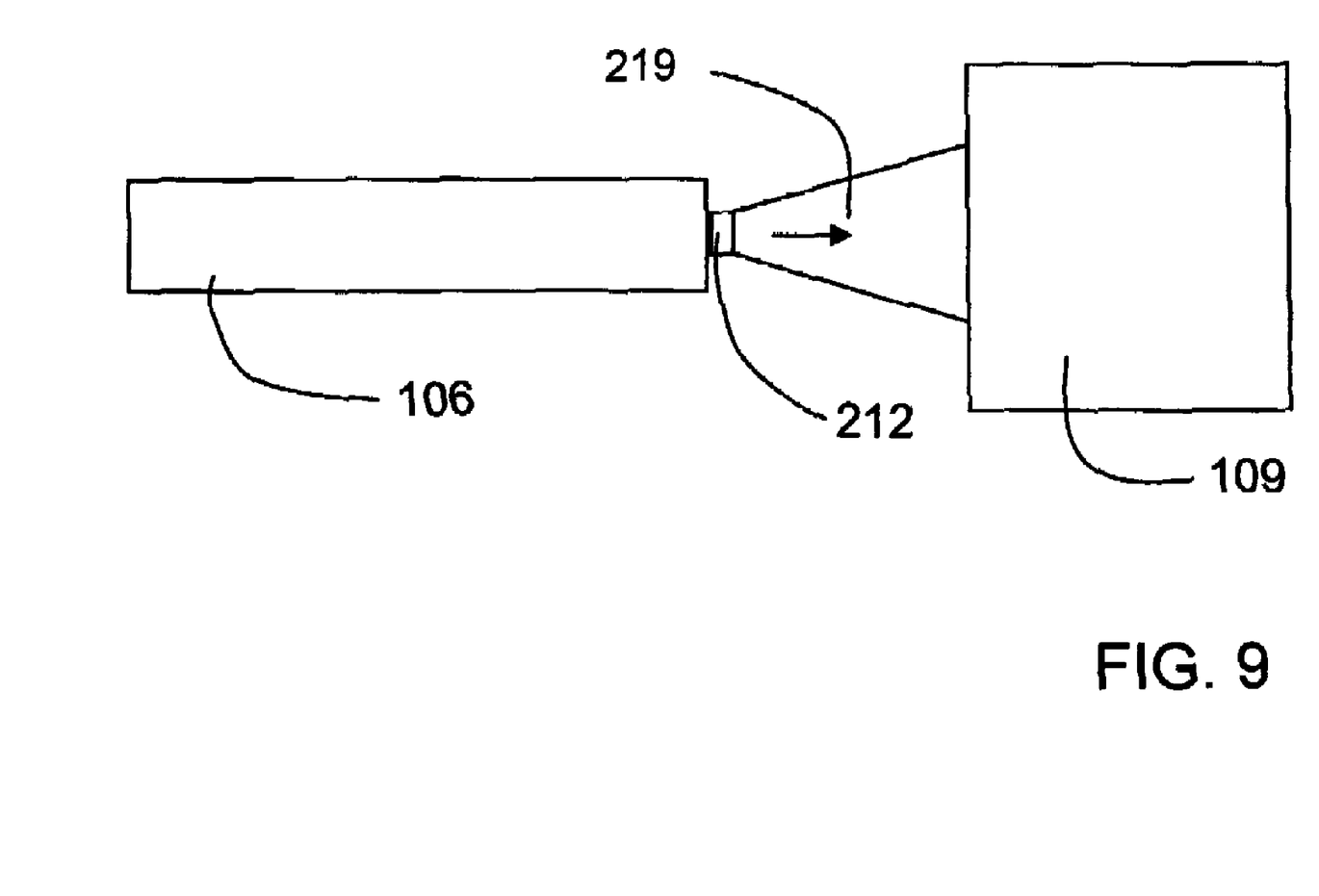
FIG. 9 shows yet another exemplary embodiment of a portion of an optical train.

Referring FIG. 9, yet another exemplary embodiment of a portion of the optical train 108 is shown. The embodiment of FIG. 9 is similar to the preceding embodiment. The laser tube 106 may include an output coupler 212 including an integrated beam expander. As with the previous embodiment, the output coupler/beam expander may emit a diverging beam 219. However, instead of passing the diverging beam through a collimating lens, or similar optical element to reduce or eliminate the divergence, the scanning system 109 may be designed to accept the diverging beam 219 emerging from the output coupler/beam expander. This aspect may be facilitated by providing the output coupler/beam expander to produce a degree of divergence selected to be accepted by the scanning system.

While alternative exemplary embodiments of a simplified portion of an optical train have been illustrated and discussed herein, it should be understood that an optical train having a conventional layout and utilizing conventional components may suitably be used with the system herein.

The scanning assembly 109 may include one or more optical beam deflectors operating to steer the laser beam. As used herein, a scanning assembly is defined as any controllable optical elements, i.e., lenses, mirrors, and/or prisms that may be used to steer a beam of light. In the exemplary embodiment, the scanning assembly 109 may steer the beam of light using one or more optical beam deflectors. As used in any embodiment herein, an optical beam deflector is any electrical and/or mechanical device or assembly that can operate to steer the laser beam along at least one axis. For example, the scanning assembly may move the focal point of the laser on a target surface to generate, or scan, a pattern on the target surface. The optical beam deflectors may move or reposition optical elements, such as mirrors or prisms, to move the beam relative to the target surface. In the illustrated embodiment, the scanning assembly includes two optical beam deflectors 118, 120, which may each be a servo actuator controlling a mirror (not shown) for steering the laser beam along an X-Y path. According to an exemplary embodiment, the optical beam deflectors 118, 120 may be limited rotation galvanometer servos, each having a shaft mounted mirror. Many other optical beam deflectors, such as rotating polygon mirrors, etc., known by those having skill in the art may also be used for steering the laser beam.

While the exemplary embodiment includes two optical beam deflectors 118, 120, one of the optical beam deflectors may be eliminated if the marking/coding system 100 is used in conjunction with a moving line. For example, if the targets to be coded or marked are moving at a predetermined or measurable speed along a conveyor or similar continuous or intermittent motion transport device, it may be possible to utilize only one optical beam deflector operating to move the beam in a direction transverse to the line of motion of the targets to be coded or marked.

The scanning assembly 109 may be configured to scan along a fixed, predetermined focal plane. Alternatively, the scanning assembly 109 of the pendant 102 may include variable focus optics allowing a contoured variable target surface to be marked or scanned. The variable focus optics may include a third axis of control, i.e., Z axis, whereby the focal length of the system is actively controlled to track the target surface. Control of the focal length may be carried out according to a predetermined program or according to outside inputs. Alternatively, variable focus optics may include an auto-focus system, wherein the focal length of the system may be actively controlled to track the results of a range finder that may be included as part of the pendant 102, or separately mounted.

A single cooling system 110 may be used for controlling the temperature of all of the components of the pendant, including the laser tube 106, optical train 108, and scanning assembly 109. Mounting or coupling the laser tube 106 and scanning assembly 109 to a common base plate 122 may be used to achieve common cooling of the pendant 102. In some embodiments, the optical train 108 may also be mounted on the common base plate 122. In the foregoing manner, the common base plate 122 may be utilized as the pendant chassis or optical bench.

The base plate 122 may be formed from a material having a high thermal conductivity, thereby facilitating flow of heat to the heat sink 124. In the illustrated embodiment, a heat sink 124 is thermally coupled to the base plate 122. In addition to providing assistance in cooling the pendant 102, the heat sink 124 may also serve to stiffen or strengthen the base plate 122, thereby providing a more robust optical bench for the laser tube 106 and scanning assembly 109. As an alternative to coupling the heat sink 124 to the base plate 122, the cooling system may be integrated directly onto the base plate 122.

The cooling system 110 may be an air cooled finned assembly that may include a fan 126 providing forced convective cooling, as in the illustrated exemplary embodiment. Additionally, or alternatively, the cooling system may include a thermoelectric cooling system coupled to the base plate 122 or to a heat sink 124. The cooling system may also include a liquid cooling system, compressed gas (e.g., air), or other known cooling system.

As also shown in FIG. 3, the pendant 102 may also include a guide or focus beam system 111. The guide or focus beam system 111 may be an LED or similar visible light generating element known to those having skill in the art. The guide or focus beam system 111 may provide a beam of visible light incident on the target surface indicating at least the general, if not the exact, area of aim and/or pattern of the primary laser generated by laser tube 106. Additionally, while not shown, those having skill in the art will appreciate that the pendant 102 may also include various other optical and/or mechanical components that may appropriately be used in conjunction with a laser coding or marking system. Such additional components may include, for example, a shutter.

The pendant 102 may be remotely coupled to a laser control system, or controller module, that provides the electronics necessary to drive or control at least one component of the pendant, e.g., the laser tube and/or scanning system and/or cooling system. According to one embodiment, the laser control system may provide the electronics and drivers necessary to drive the laser and steer the laser beam, i.e., control the scanning system. Consistent with the exemplary system 100, the controller or driver module may be a plug-in-module 104. The plug in module 104, or other remote controller/driver module, may be coupled to the pendant 102, e.g., via a cable for providing the necessary power and control inputs to the pendant 102, as well as any feedback outputs from the pendant 102.

Figure 5:
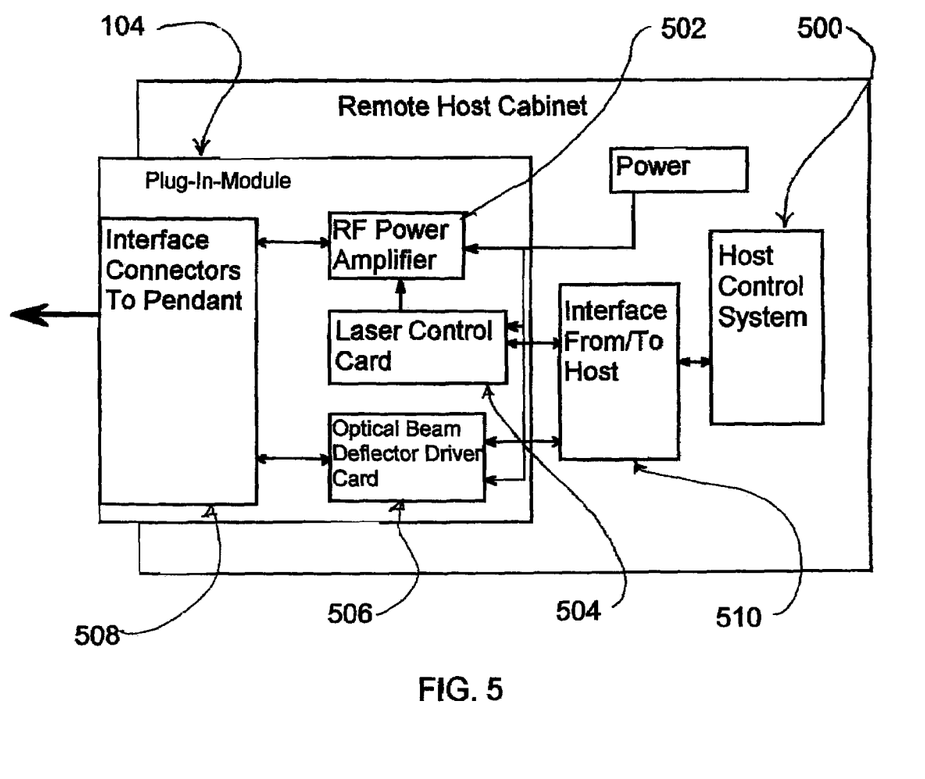
FIG. 5 is an illustration of an exemplary embodiment of a plug-in-module.

Referring to FIG. 5, the plug-in-module 104 may be coupled to a host control system 500. The host control system 500 is a control system that may send and receive control signals to and from the plug-in-module 104 and the pendant 102. Power for driving the laser tube 106, as well as control signals for the laser and the scanning assembly 109, etc. may be conveyed to the pendant 102 from the plug-in-module 104 via a cable including various shielded lines, e.g. for carrying RF power to the laser tube, and/or unshielded lines.

The plug-in-module 104 may contain essential controls for the pendant 102, namely any electronics necessary to drive the laser tube 106, the scanning assembly 109, and the cooling system 110 which are not included on the pendant 102. Illustrated in the block diagram of FIG. 5, the plug-in-module 104 may include an RF power amplifier 502 needed to drive the laser tube 106 to produce the laser beam, as well as a heat sink for the RF power amplifier (not shown). The RF power amplifier 502 may be controlled by a laser control card 504 on the plug-in module 104. The laser control card 504 may drive the RF power amplifier 502 according to instructions received from the host control system 500, controlling firing of the laser as well as the intensity, duration, etc. of the laser beam.

The plug-in-module 104 may also include one or more optical beam deflector control card(s) 506. The optical beam deflector control card(s) 506 may include the electronics needed to drive the optical beam deflectors 118, 120 of the pendant scanning assembly 109. The host control system 500 may provide instructions to the optical beam deflector control card(s) 506, which may in turn generate an output to the scanning assembly 109. The input received by the scanning assembly 109 from optical beam deflector control card(s) 506 may control the path, sweep velocity, etc. of the laser on the target surface.

The plug-in-module 104 may also include interface connectors and electronics 508 to couple the RF power amplifier 502 and the servo control card(s) 506 with the pendant cable. Similarly, the plug-in-module 104 may include interface connectors and electronics 510 for coupling the RF power amplifier 502, the laser control card 504, and the optical beam deflector control card(s) 506 to the host control system 500. The interface connectors and electronics 510 between the host control system 500 and the plug-in-module 104 may provide power to the plug-in-module and control signals from the host control system 500 to the laser control card 504 and the optical beam deflector control card 506, as well as power to the RF power amplifier 502. Additionally, the interface connectors and electronics 510 may provide feedback signals from the pendant 102 and/or the plug-in-module 104 to the host control system 500.

As stated above, the plug-in-module 104 may be coupled to the host control system 500. Herein this requires only that the plug-in-module is capable of at least receiving control instructions from the host control system 500. Control instructions may be received, for example, via a data connection, either analog or digital, between the plug-in-module 104 and the host control system 500. Those having skill in the art will appreciate that data connection may be wired, radio frequency wireless, infrared, etc. Accordingly, the plug-in-module 104 may be a separate, external component relative to the host control system. Alternatively, the plug-in-module may be at least partially contained within a host control system cabinet or housing. Whether the plug-in-module is external or at least partially internal relative to the host control system, the plug-in module may be either removably coupled to the host control system 500 or non-removably coupled thereto.

According to one aspect, the plug-in-module 104 may be a drop-in component for the host control system 500. That is, the plug-in-module 104 may be configured to slide into the cabinet of a remote host and receive power and control signals from the host control system 500 through a connector from the host control system 500. The same connector may be used to deliver feedback and/or status information from the plug-in-module to the host control system 500. The host control system 500 may include or provide some or all programmed information, such as the make up of the code information, and connectivity to other devices, such as sensors master computers. Consistent with this aspect, the plug-in-module 104 may be quickly separated from a kiosk control station or console, i.e., host control system 500, and swapped out with the pendant 102, thereby reducing programming and/or configuration set-up of the replacement unit. The hardware of the laser system 100 may, therefore, be changed with minimal, or no, change of the control system. The ability to perform such "quick changes" may reduce production down time when the laser marking/coding system must be changed.

According to another aspect, the pendant 102 may be hard wired to the plug-in module 104. The RF power amplifier 502 and optical beam deflector driver card 506 may be match tuned to the corresponding devices in the pendant 102. The pendant 102 and the plug-in-module 104 may, therefore, be handled as a unit or matched pair. It may also be desirable for the RF connection between the RF power amplifier 502 and the laser tube 106 to be a fixed length in order to achieve proper operation of the laser. This aspect may also be facilitated by handling the pendant 102 and plug-in-module 104 as a matched pair. Components such as digital servos and self-calibrating controls may, however, obviate the need or desire to provide the pendant 102 and plug-in-module 104 as a unit or matched pair. In this last configuration, the pendant 102 and plug-in-module 104 may be replaced independently of each other.

FIG. 6 illustrates a complete exemplary compact laser system 100 consistent with the present disclosure. As previously described, the laser system 100 may include a pendant 102 including the laser tube, optics, and scanning system. The pendant 102 is coupled to a plug-in-module 104, e.g., via cable 602. The plug-in-module 104 may include the drivers and control electronics necessary to power and control the laser as well as controlling the scanning system.

To this point, the disclosure has involved the placement of the operable components, e.g., the laser tube, optics, and scanning system, in a separate and/or remote housing from the control electronics. However, those having skill in the art will appreciate that at least some of the control electronics, previously described as being part of the plug-in-module, may be included in the pendant. For example, all, or part, of the servo control electronics (e.g., position preamp, and position, damping, and integration electronics) may be included on the pendant, while components, such as the servo power amplifier, may be included in the plug-in-module. It will be appreciated that still further alternative divisions of the components of a laser marking and coding system may be made between the pendant and the plug-in-module.

Although this disclosure describes the use of a $CO_2$ laser, those having skill in the art will recognize that it is possible to substitute other lasers in its place, for example, a diode pumped solid state YAG or UV laser. In the same way, although the disclosure describes the use of an assembly of X-Y Galvos and optics, it may be possible to substitute a Phased array beam steering element, spinning mirror scanner, and/or acusto-optic beam deflector for one or both axes. Coding and marking can also be achieved by the use of a single scanning axis where the other axis of motion is achieved by product motion.

In view of the foregoing, it should be understood that the exemplary embodiments described herein are susceptible to modification and variation without materially departing from the present invention. Accordingly, the invention herein should not be limited by the described embodiments, but only by the claims appended hereto.

What is claimed is:

1. A system, comprising:
    a pendant comprising a carbon dioxide laser tube comprising at least an optical resonator being capable of generating a laser beam, and a scanning system comprising at least one optical beam deflector being capable of controlling a path of said laser beam, and a cooling system coupled to said laser tube, said laser tube, said scanning system, and said cooling system being enclosed within a common housing; and
    a plug-in-module remotely coupled to said pendant, said plug-in-module comprising an RF power source being capable of driving said laser, a power source controller being capable of controlling said power source, and a optical beam deflector controller being capable of controlling said scanning system, said RF power source, power source controller and said optical beam deflector controller being enclosed in a second common housing, and said plug-in-module configured to plug into a host control system providing power and coordinated control signals to said power source controller and said optical beam deflector controller.

2. The system according to claim 1, wherein said plug in-module is configured to removably plug into a host control system.

3. The system according to claim 2, wherein said plug-in-module is configured to externally removably plug into said host control system.

4. The apparatus according to claim 1, wherein said laser tube comprises at least a part of an optical train being capable of at least one of shaping and focusing said laser beam.

5. The apparatus according to claim 1, wherein said scanning system comprises at least a part of an optical train being capable of at least one of shaping and focusing said laser beam.

6. The apparatus according to claim 1, wherein said laser tube further comprises a folded laser cavity.

7. The apparatus according to claim 1, wherein said scanning system further comprises at least an X-axis and a Y-axis optical beam deflector, respectively controlling the path of said laser beam in an X-direction and a Y-direction.

8. The apparatus according to claim 1, wherein said at least one optical beam deflector comprises a galvanometer.

9. The apparatus according to claim 1, wherein said scanning system comprises at least one of a phased array beam steering element, a spinning mirror scanner, and an acousto-optic beam deflector controlling a path of a laser beam generated in said laser tube.

10. The apparatus according to claim 1, wherein said pendant comprises an optical train, and said optical train comprises a folded optical path.

11. The apparatus according to claim 1, wherein said pendant comprises an optical train, and said optical train comprises a beam expander integral with an output coupler of said laser tube.

12. The apparatus according to claim 10, wherein said optical train comprises a beam expander/collimator, and a first element of said beam expander/collimator is integral with an output coupler of said laser tube.

* * * * *